United States Patent
Hu et al.

(10) Patent No.: US 11,375,408 B2
(45) Date of Patent: Jun. 28, 2022

(54) LOCAL BREAKOUT ARCHITECTURE

(71) Applicant: XCOM Labs, Inc., San Diego, CA (US)

(72) Inventors: Yuming Hu, San Diego, CA (US); Michael Mingxi Fan, San Diego, CA (US)

(73) Assignee: XCOM Labs, Inc., San Diego, CA (US)

( * ) Notice: Subject to any disclaimer, the term of this patent is extended or adjusted under 35 U.S.C. 154(b) by 77 days.

(21) Appl. No.: 16/810,008

(22) Filed: Mar. 5, 2020

(65) Prior Publication Data
US 2020/0288352 A1   Sep. 10, 2020

Related U.S. Application Data
(60) Provisional application No. 62/814,784, filed on Mar. 6, 2019.

(51) Int. Cl.
*H04W 28/24* (2009.01)
*H04W 72/04* (2009.01)
(Continued)

(52) U.S. Cl.
CPC .............. *H04W 28/24* (2013.01); *H04L 47/20* (2013.01); *H04L 47/2408* (2013.01);
(Continued)

(58) Field of Classification Search
CPC .... H04L 47/20; H04L 47/2408; H04W 28/24; H04W 28/08; H04W 72/0413;
(Continued)

(56) References Cited

U.S. PATENT DOCUMENTS 6,424,657 B1 * 7/2002 Voit .................. H04Q 11/0478
370/420
7,069,037 B2   6/2006 Lott
(Continued)

FOREIGN PATENT DOCUMENTS

WO    WO 2008/110215     9/2008

OTHER PUBLICATIONS

International Search Report dated Jun. 26, 2020 for International Patent Application No. PCT/US2020/021099.
(Continued)

*Primary Examiner* — Chi H Pham
*Assistant Examiner* — Weibin Huang
(74) *Attorney, Agent, or Firm* — Knobbe, Martens, Olson & Bear, LLP

(57) ABSTRACT

Aspects of this disclosure relate to local breakout. A network node can receive remote downlink traffic from a remote network, receive local downlink traffic from a local resource, aggregate at least the remote downlink traffic with the local downlink traffic based on one or more filters stored in memory of the network node, and route the aggregated downlink traffic to a wireless communication device. The remote downlink traffic can be associated with a first application of the wireless communication device, and the local downlink traffic can be associated with a second application of the wireless communication device. The network node can be a local gateway in certain embodiments. The network node can steer uplink traffic steering by filtering uplink traffic associated with the wireless communication device into local uplink traffic and remote uplink traffic based on at least one filter for filtering traffic stored in the memory.

22 Claims, 10 Drawing Sheets

(51) Int. Cl.
*H04W 88/08* (2009.01)
*H04W 88/16* (2009.01)
*H04L 47/20* (2022.01)
*H04W 28/08* (2009.01)
*H04L 47/2408* (2022.01)

(52) U.S. Cl.
CPC ......... *H04W 28/08* (2013.01); *H04W 72/042* (2013.01); *H04W 72/0413* (2013.01); *H04W 72/0426* (2013.01); *H04W 88/085* (2013.01); *H04W 88/16* (2013.01)

(58) Field of Classification Search
CPC ........... H04W 72/042; H04W 72/0426; H04W 88/085; H04W 88/16
See application file for complete search history.

(56) References Cited

U.S. PATENT DOCUMENTS

| | | |
|---|---|---|
| 7,206,598 B2 | 4/2007 | Attar |
| 7,363,353 B2 | 4/2008 | Ganesan et al. |
| 7,376,209 B2 | 5/2008 | Namgoong |
| 7,525,909 B2 | 4/2009 | Fan |
| 7,719,991 B2 | 5/2010 | Bhhan |
| 7,729,714 B2 | 6/2010 | Black |
| 7,738,906 B2 | 6/2010 | Attar |
| 8,098,767 B2 | 1/2012 | Mirbagheri |
| 8,160,596 B2 | 4/2012 | Black |
| 8,351,327 B1* | 1/2013 | Binns ................. H04L 67/148 370/229 |
| 8,396,152 B2 | 3/2013 | Attar |
| 8,452,011 B2 | 5/2013 | Guo |
| 8,493,958 B2 | 7/2013 | Attar |
| 8,498,192 B2 | 7/2013 | Bhhan |
| 8,537,875 B2 | 9/2013 | Soriaga |
| 8,611,325 B2 | 12/2013 | Black |
| 8,635,645 B2 | 1/2014 | Krishnamoorthi |
| 8,732,272 B2 | 5/2014 | Deshpande |
| 8,744,018 B2 | 6/2014 | Chen |
| 8,831,156 B2 | 9/2014 | Liang |
| 8,839,079 B2 | 9/2014 | Chen |
| 8,849,297 B2* | 9/2014 | Balasubramanian ........................ H04L 41/5054 455/452.2 |
| 8,879,440 B2 | 11/2014 | Guo |
| 8,891,436 B2 | 11/2014 | Zhang |
| 8,897,188 B2 | 11/2014 | Black |
| 8,897,256 B2 | 11/2014 | Cherian |
| 8,948,095 B2 | 2/2015 | Black |
| 8,948,147 B2 | 2/2015 | Zheng |
| 9,007,942 B2 | 4/2015 | Zhao |
| 9,119,217 B2 | 8/2015 | Black |
| 9,264,972 B2 | 2/2016 | Fan |
| 9,450,638 B2 | 9/2016 | Yan |
| 9,461,736 B2 | 10/2016 | Bhhan |
| 9,497,495 B2 | 11/2016 | Krishnamoorthi |
| 9,509,452 B2 | 11/2016 | Liang |
| 9,609,649 B2 | 3/2017 | Fan |
| 9,673,837 B2 | 6/2017 | Xue |
| 9,750,014 B2 | 8/2017 | Sadek |
| 10,044,438 B2 | 8/2018 | Kado |
| 10,244,399 B2 | 3/2019 | Damnjanovic |
| 10,334,546 B2 | 6/2019 | Chendamarai Kannan |
| 10,440,731 B2 | 10/2019 | Fan |
| 10,448,257 B2 | 10/2019 | Patel |
| 10,455,457 B2 | 10/2019 | Sadek |
| 10,484,935 B2 | 11/2019 | Li |
| 10,536,944 B2 | 1/2020 | Zhang |
| 10,575,185 B2 | 2/2020 | Li |
| 10,582,458 B2 | 3/2020 | Sadek |
| 10,616,769 B2 | 4/2020 | Damnjanovic |
| 10,616,845 B2 | 4/2020 | Fan |
| 2006/0229089 A1 | 10/2006 | Tokgoz |
| 2011/0286384 A1 | 11/2011 | Sugimoto et al. |
| 2013/0201959 A1 | 8/2013 | Guo |
| 2013/0229990 A1 | 9/2013 | Fan |
| 2014/0056239 A1 | 2/2014 | Zhang |
| 2014/0161055 A1 | 6/2014 | Chitrapu et al. |
| 2014/0247814 A1 | 9/2014 | Zhang |
| 2014/0285684 A1 | 9/2014 | Huang |
| 2014/0362744 A1 | 12/2014 | Yan |
| 2015/0063150 A1 | 3/2015 | Sadek |
| 2015/0063151 A1 | 3/2015 | Sadek |
| 2015/0063323 A1 | 3/2015 | Sadek |
| 2015/0094063 A1 | 4/2015 | Hu |
| 2015/0223077 A1 | 8/2015 | Fan |
| 2015/0326382 A1 | 11/2015 | Li |
| 2017/0041828 A1* | 2/2017 | Zhang ..................... H04L 67/04 |
| 2017/0251473 A1 | 8/2017 | Xue |
| 2017/0265100 A1* | 9/2017 | Ryu ....................... H04W 36/12 |
| 2017/0272368 A1* | 9/2017 | Mestanov ............... H04L 47/41 |
| 2017/0318586 A1 | 11/2017 | Wang |
| 2017/0331688 A1* | 11/2017 | Mestanov ............... H04L 63/20 |
| 2018/0042018 A1 | 2/2018 | Bhhan |
| 2018/0109957 A1 | 4/2018 | Fan |
| 2018/0139782 A1 | 5/2018 | Sadek |
| 2020/0022029 A1 | 1/2020 | Sadek |
| 2020/0059854 A1 | 2/2020 | Li |
| 2020/0100250 A1 | 3/2020 | Zhang |
| 2020/0244528 A1* | 7/2020 | He ......................... H04L 1/1812 |

OTHER PUBLICATIONS

Written Opinion dated Jun. 26, 2020 for International Patent Application No. PCT/US2020/021099.
3GPP TR 32.899, "3rd Generation Partnership Project; Technical Specification Group Services and Systems Aspects; Telecommunication management; Study on charging aspects of 5G system architecture phase 1", Version 15.1.0, Release 15, Mar. 2018, pp. 1-104.
Ali, et al., "Quality of Service in 3GPP R12 LTE-Advanced," IEEE Communications Magazine, Aug. 2013, pp. 103-109.
GSM Association, "VoLTE-RCS Roaming and Interconnection Guidelines," Version 1.0, May 19, 2015, pp. 1-30.

* cited by examiner

LOCAL BREAKOUT ARCHITECTURE

CROSS REFERENCE TO PRIORITY APPLICATION

This application claims the benefit of priority of U.S. Provisional Patent Application No. 62/814,784, filed Mar. 6, 2019 and titled "LOCAL BREAKOUT ARCHITECTURE," the disclosures of which is hereby incorporated by reference herein in its entirety and for all purposes.

BACKGROUND

Technical Field

Embodiments of this disclosure relate to local breakout in communications systems.

Description of Related Technology

The types of modern computing devices continues to increase along with the differing and dynamic needs of each device. The wireless communication systems providing services to such devices are facing increasing constraints on resources and demands for quality and quantities of service. In certain wireless communication systems, wireless communications devices can benefit from wireless communications services with access to a local server and/or a local network. This can enable low latency communications.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a network node with local breakout. The network node includes a memory and a traffic aggregation block. The memory is configured to store one or more filters for aggregating traffic. The traffic aggregation block includes physical hardware configured to receive local downlink traffic associated with a wireless communication device, receive remote downlink traffic associated with the wireless communication device, and aggregate at least the local downlink traffic and the remote downlink traffic into aggregated downlink traffic based on at least one of the one or more of the filters. The network node is configured to receive the local downlink traffic from a local resource, receive the remote downlink traffic from a remote network, and route the aggregated downlink traffic to the wireless communication device such that the wireless communication device receives the local downlink traffic with a lower latency than the remote downlink traffic.

The remote downlink traffic can be associated with a first application of the wireless communication device, and the local downlink traffic can be associated with a second application of the wireless communication device. A first filter of the one or more filters can be associated with a first application of the wireless communication device. A second filter of the one or more filters can be associated with a second application of the wireless communication device.

The network node can further include a quality of service block. The quality of service block can include physical hardware configured to determine whether to implement quality of service based on one or more local policies stored in the memory. The quality of service block can implement one or more quality of service parameters based on the one or more local policies in response to determining to implement quality of service.

The local downlink traffic and the remote downlink traffic can be associated with the same Access Point Name.

The network node can be a local gateway that is coupled between a base station and the remote network. The local gateway can include a local serving gateway and a local packet gateway. The local serving gateway can include the traffic aggregation block and a quality of service block. The local packet gateway can trigger a dedicated bearer for the local downlink traffic in response to the quality of service block determining to implement quality of service.

The network node can be a next generation Node B (gNB). The gNB can trigger quality of service.

The traffic aggregation block can be configured to generate the aggregated downlink traffic by at least determining whether information from a header of a packet of the local downlink traffic corresponds to at least one of the one or more filters.

The one or more filters can identify at least one of a source Internet Protocol address, a source Internet Protocol port, a target Internet Protocol address, a target Internet Protocol port, a Type of Service value, or a Differentiated Services Code Point value.

The network node can further include a traffic steering block configured to receive uplink traffic associated with the wireless communication device and filter the uplink traffic into local uplink traffic and remote uplink traffic based on at least one filter for filtering traffic. The memory can store the at least one filter for filtering traffic. The network node can be configured to route the local uplink traffic to a local network and route the remote traffic to the remote network, the local network including the local resource. The traffic steering block can be configured to filter the uplink traffic by at least determining whether information from a header of a packet of the uplink traffic corresponds to the at least one filter for filtering traffic.

Another aspect of this disclosure is a method of local breakout. The method includes receiving, by a network node, remote downlink traffic from a remote network, wherein the remote downlink traffic is associated with a first application of a user equipment; receiving, by the network node, local downlink traffic from a local resource, wherein the local downlink traffic is associated with a second application of a user equipment; aggregating, by the network node, at least the remote downlink traffic with the local downlink traffic into aggregated downlink traffic based on one or more filters stored in memory of the network node; and routing, by the network node, the aggregated downlink traffic to the user equipment.

The method can further include determining, by the network node, to implement quality of service based on one or more local policies stored in the memory of the network node.

The local downlink traffic and the remote downlink traffic can be associated with the same Access Point Name.

The aggregating can include determining whether information from a header of a packet of the local downlink traffic matches with at least one of the one or more filters.

The network node can be a local gateway that is coupled between a base station and a remote network.

The network node can be a next generation Node B (gNB).

The method can further include receiving, by the network node, uplink traffic; filtering the uplink traffic into local uplink traffic and remote uplink traffic based on one or more filters for filtering traffic stored in the memory of the network node, wherein the remote uplink traffic is associated with the first application of the user equipment, and wherein the local uplink traffic is associated with the second application of the user equipment; routing the local uplink traffic to a local network that comprises the local resource; and routing the remote uplink traffic to the remote network.

Another aspect of this disclosure is a method of wireless communication. The method includes transmitting, by a user equipment, first uplink data associated with a first application of the user equipment to a network node; transmitting, by the user equipment, second uplink data associated with a second application of the user equipment to the network node, wherein the second application has a lower latency specification than the first application, and wherein the first uplink data and the second uplink data are associated with the same Access Point Name; receiving, by the user equipment, first downlink data associated with the first application from a remote network via the network node; and receiving, by the user equipment, second downlink data associated with the second application from a local resource via the network node such that the second uplink data is received with a lower latency than the first uplink data.

The user equipment can be connected to the remote network while quality of service is implemented by the local network that includes the local resource.

Another aspect of this disclosure is a network node that includes a memory configured to store one or more filters for filtering traffic and a traffic steering block. The traffic steering block is configured to receive uplink traffic associated with a wireless communication device and filter the uplink traffic into local traffic and remote traffic based on at least one of the one or more of the filters. The network node is configured to receive the uplink traffic, route the local uplink traffic to a local resource, and route the remote traffic to a remote network.

The network node can be a local gateway configured to receive the uplink traffic from a base station. The local gateway can include a local serving gateway and a local packet gateway. The local serving gateway can include the traffic steering block and a quality of service block. The local packet gateway can be configured to trigger a dedicated bearer for the local traffic in based on one or more local policies stored in the memory. The one or more local policies can correspond to at least one of enabling quality of service, disabling quality of service, a Quality of Service Class Identifier, or an Address Resolution Protocol for the local traffic.

The network node can be a next generation Node B (gNB).

The remote traffic can be associated with a first application of the wireless communication device, and the local traffic can be associated with a second application of the wireless communication device.

The network node can further include a quality of service block configured to determine whether to implement quality of service based on one or more local policies stored in the memory. The quality of service block can be configured to implement one or more quality of service parameters based on the one or more local policies in response to determining to implement quality of service.

The local traffic and the remote traffic can be associated with the same Access Point Name.

The traffic steering block can be configured to filter the uplink traffic by at least determining whether information from a header of a packet of the uplink traffic corresponds to at least one of the one or more filters.

A first filter of the one or more filters can be associated with a first application of the wireless communication device, and a second filter of the one or more filters can be associated with a second application of the wireless communication device. The one or more filters can identify at least one of a source Internet Protocol address, a source Internet Protocol port, a target Internet Protocol address, a target Internet Protocol port, a Type of Service value, or a Differentiated Services Code Point value.

The network node can further include a traffic aggregation block configured to aggregate at least downlink remote traffic with downlink local traffic to generate aggregated downlink traffic, and to route the aggregated downlink traffic to the wireless communication device via the base station.

Another aspect of this disclosure is a local gateway that includes a memory configured to store one or more filters for filtering traffic and a traffic steering block. The traffic steering block is configured to receive uplink traffic associated with a user equipment and filter the uplink traffic into local traffic and remote traffic based on at least one of the one or more of the filters. The local gateway is configured to receive the uplink traffic from a base station, route the local uplink traffic to a local resource, and route the remote traffic to a remote network.

Another aspect of this disclosure is a method of local breakout. The method includes receiving, by a network node, uplink traffic; filtering the uplink traffic into local traffic and remote traffic based on one or more filters stored in memory of the network node, wherein the remote traffic is associated with a first application of a user equipment, and wherein the local traffic is associated with a second application of the user equipment; routing the local traffic to a local resource; and routing the remote traffic to a remote network.

The network node can be a local gateway configured to receive the uplink traffic from a base station.

The method can further include determining, by the network node, whether to implement quality of service based on one or more local policies stored in the memory of the network node. The method can further include implementing quality of service parameters based on the one or more local policies in response to determining to implement quality of service. The method can further include triggering, by a local packet gateway of a local gateway, a dedicated bearer for the local traffic in response to determining to implement quality of service, wherein the network node is the local gateway. The one or more local policies can correspond to at least one of enabling quality of service, disabling quality of service, a Quality of Service Class Identifier, or an Address Resolution Protocol for the local traffic.

The local traffic and the remote traffic can be associated with the same Access Point Name.

The filtering can include determining whether information from a header of a packet of the uplink traffic matches with at least one of the one or more filters.

The one or more filters can identify at least one of a source Internet Protocol address, a source Internet Protocol address, a target Internet Protocol address, a target Internet Protocol port, a Type of Service value, or a Differentiated Services Code Point value.

The method can further include aggregating, by the network node, at least downlink local traffic associated with the second application with downlink remote traffic associated with the first application to generate aggregated downlink traffic; and routing, by the network node, the aggregated downlink traffic to the user equipment via the base station.

Another aspect of this disclosure is a local gateway that includes a memory configured to store one or more filters for aggregating traffic and a traffic aggregation block. The traffic aggregation block is configured to receive local downlink traffic associated with a user equipment, receive remote downlink traffic associated with the user equipment, and aggregate at least the local downlink traffic and the remote downlink traffic into aggregated downlink traffic based on at least one of the one or more of the filters. The local gateway is configured to receive the local downlink traffic from a local resource, receive the remote downlink traffic from a remote network, and to and route the aggregated downlink traffic to a base station.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
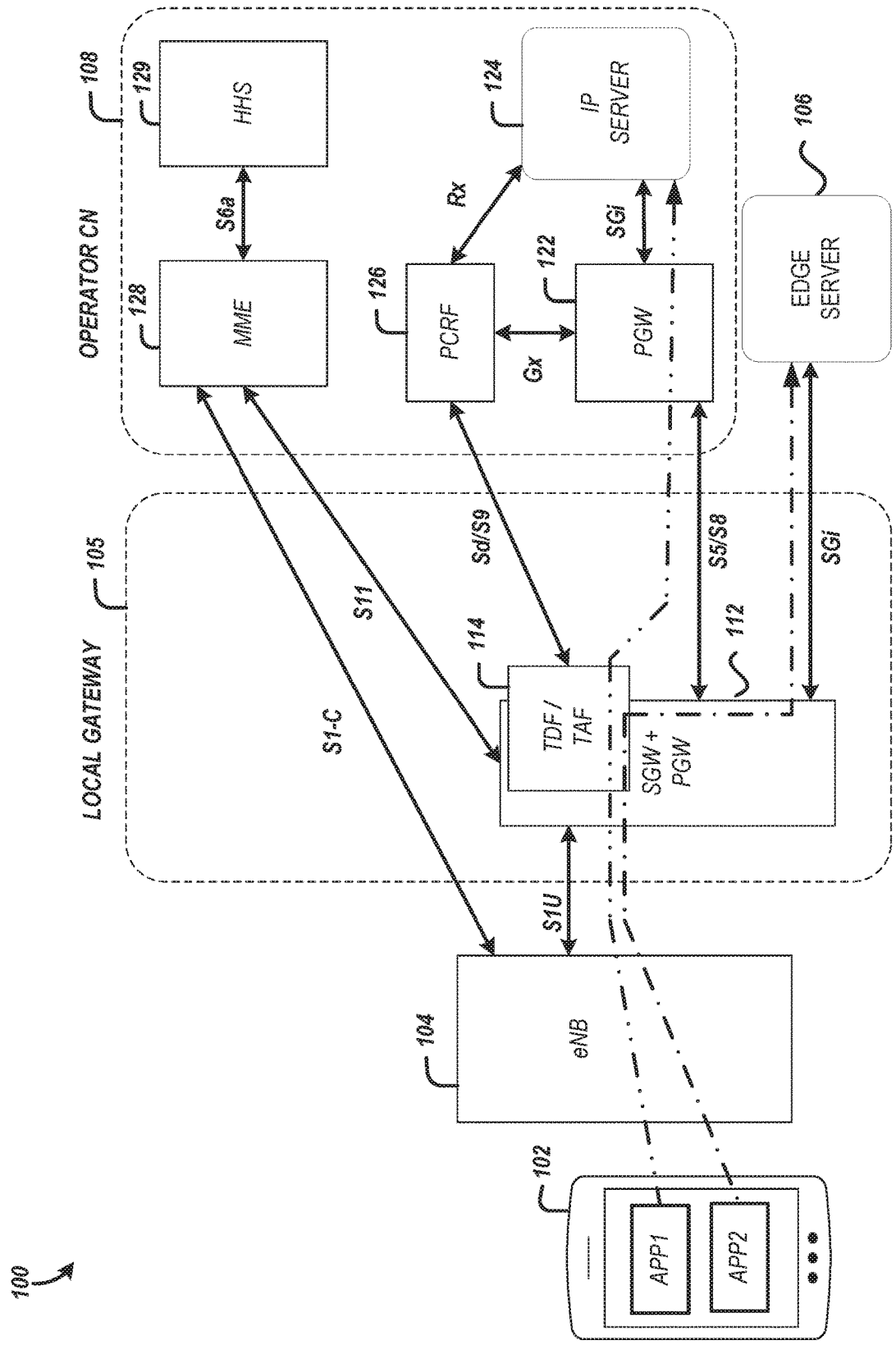
FIG. 1 is a diagram illustrating a local breakout architecture in a communication environment according to an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

For $4^{th}$ Generation (4G) Long Term Evolution (LTE) networks, more and more applications and services desire direct access to a local resource, such as a local server and/or a local network, instead of a remote core network, such as an Evolved Packet Core (EPC) network. Similarly, an increasing number of applications and services are likely to desire access to local resources in $5^{th}$ Generation (5G) networks. Access to local resources can be desired by services with low latency specifications, such as low latency and high bandwidth specifications. In some instances, communications with a local resource can be performed with a latency of less than 20 milliseconds. Alternatively or additionally, communications with a local resource can be performed with bandwidth of at least 10 megabits of data per second. Enabling local breakout (LBO) and quality of service (QoS) can be significant to achieving the desired latency and/or throughput. LBO disclosed herein can be implemented, for example, when a UE connects to a network in a venue, such as a stadium. LBO disclosed herein can be implemented in a variety of other contexts.

A user equipment (UE) can set up a data connection with a remote network, which can include both a default Evolved Packet System (EPS) bearer and a dedicated EPS bearer for QoS. Remote EPC can be used for applications and/or services with latency and/or throughput specifications that can be achieved without local breakout. After a UE establishes data connection(s) with the remote network, a Local Breakout Gateway (LBO GW) can filter out uplink traffic associated with applications and/or services for LBO according to one or more predefined filters and/or one or more local policies. Then related traffic can be redirected to local resources, such as to local servers and/or a local network. As one example, the LBO GW can route local traffic associated with streaming video in a private network and other traffic can be routed to a core network. Filters for LBO can include a source Internet Protocol (IP) address and/or port, a target IP address and/or port, Type of Service (ToS) value and/or Differentiated Services Code Point (DSCP) value, the like, or any suitable combination thereof. Filters for LBO can be for specific applications. For each specific application and/or service, a profile in a local policy may include one or more of enable/disable QoS, QoS Class Identifier (QCI), Address Resolution Protocol (ARP), QoS Flow Identifier (QFI), or the like. The LBO GW can merge downlink traffic generated from local resources, such as local servers and/or a local network, back into data connection(s) between UE and remote EPC, then transfer the merged downlink traffic to UE.

Local breakout architectures disclosed herein can enable and/or disable a local QoS. QoS can be triggered locally. The LBO GW can trigger QoS based on information in a packet, such as information in a header of a packet. With local breakout enabled, if warranted according to predefined local policy, the LBO GW can trigger a QoS setup to establish a dedicated EPS bearer between the UE and the LBO GW for specific application(s) and/or service(s). The LBO GW can also determine assigned QoS priority according to a local policy. With local QoS, different locations can implement different QoS for the same UE and the same application and/or service.

Local breakout gateways disclosed herein can facilitate co-location of a Serving Gateway (SGW) and a local application server. A Packet Data Network Gateway (PGW) can also be co-located with the local application server. With local breakout disclosed herein, a device-based Access Point Name (APN) can be the same for a first application that communicates with a local network and a second application that communicates with a core network. Accordingly, device provisioning can be unchanged. Local breakout described herein can be implemented transparent to a UE. Inter-EPC handover between local and macro coverage can be eliminated with local breakout architectures disclosed herein.

The SGW of a local gateway can include a traffic detection feature (TDF) block and a traffic aggregation function (TAF) block. The TDF block and the TAF block can be implemented by any suitable physical hardware configured to perform the functions of these blocks disclosed herein. For example, one or more servers can implement the TDF block and the TAF block. The TDF block and/or the TAF block can be implemented by one or more processors in communication with any suitable non-transitory memory. The TDF block and the TAF block can be implemented by shared physical hardware, separate physical hardware, or a combination of shared and separate hardware. The TDF block can implement traffic steering policies. The TDF block can filter and steer different types of uplink traffic (e.g., traffic associated with different applications and/or services) to a local application server based on one or more predefined filters. For uplink traffic, the TDF block can differentiate between local traffic and remote traffic and route such traffic accordingly. The TAF block can aggregate downlink traffic from local resources and remote resources. With such aggregation, a user equipment can receive local traffic from a local resource with lower latency than remote traffic from a remote resource.

QoS for applications and/or services with LBO enabled can be triggered and enabled by a local gateway based on a local policy while a UE has connections with a remote EPC and/or with another remote network. In some instances, the UE can have QoS connections with the remote network when local QoS is triggered by the local gateway.

FIG. 1 is a diagram illustrating a local breakout architecture in a communication environment 100 according to an embodiment. As illustrated, the communication environment 100 includes a UE 102, a base station 104, a local gateway 105, a local server 106, and a remote network 108. The local gateway 105 can perform SGW and TDF based traffic steering. The local gateway 105 can perform local breakout transparent to the UE 102. In certain instances, the local gateway 105 can include a 3rd Generation Partnership Project (3GPP) compliant SGi LBO (e.g., a Selected IP Traffic Offload (SIPTO)) from the SGW interface. According to some other instances, LBO can be compliant with one or more other communication standards. As shown in FIG. 1, the TDF block and SGW can be co-located and support an Sd interface with a Policy and Charging Rules Function (PCRF) server of the remote network 108. An example of uplink traffic steering will be discussed with reference to FIG. 1.

The UE 102 communicates with the base station 104 via a wireless link. The base station 104 can be an Evolved Node B (eNB) in certain instances. The base station 104 is in communication with the local gateway 105. The local gateway 105 can include a combined SGW and PGW 112 and a TDF/TAF block 114. In TDF/TAF block 114 can be included in a local SGW. The remote network 108 can be an operator carrier network. The illustrated remote network 108 includes a remote PGW 122, a remote server 124, a PCRF server 126, a Mobile Management Entity (MME) 128, and a HSS (Home Subscriber Server) 129. The remote server 124 can be an IP server.

The UE 102 can signal the MME 128 via the base station 104 to initiate paging and authentication of the UE 102. This can involve accessing user information, such as one or more of identification, addressing, profile information, or the like from the HSS 129. The base station 104 can communicate with the MME 128 over a S1-C interface. The MME 128 can communicate with the HHS 129 over an S6a interface. The MME 128 can communicate with the combined SGW and PGW over a S11 interface. The combined SGW and PGW 112 can communicate with the PCRF server 126 to establish charging for traffic associated with the UE 102. This can be done over an Sd/S9 interface. The PCRF 126 can communicate with the remote PGW 122 over a Gx interface. The PCRF 126 can communicate with the remote server 124 over an Rx interface.

A wireless communication device may be referred to a user equipment (UE). The UE 102 may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. For instance, the UE 102 can be a smartphone. In some implementations, the UE 102 may be and/or include a sensor or other networked device configured to collect data and wirelessly provide the data to a device (e.g., server) connected to a core network such as the Internet. Such devices may be referred to as Internet of Things devices (IoT devices). A downlink (DL) transmission generally refers to a communication from a network to a user equipment, and an uplink (UL) transmission generally refers to a communication from the user equipment to the network. Although embodiments may be described with reference to a UE for illustrative purposes, any suitable principles and advantages disclosed herein can be implemented with any suitable wireless communication device arranged to wirelessly communicate with a network. Such wireless communication devices can include mobile devices.

The UE 102 can execute a plurality of applications. For instance, as illustrated, the UE 102 is executing a first application APP1 and a second application APP2. The first application APP1 can communicate with the remote network 108. The first application APP1 can handle a longer latency than the second application APP2. The second application APP2 can communicate with a local network that includes the local server 106. For example, the second application APP2 can desire low latency and high bandwidth communication services. The first application APP1 and the second application APP2 can be associated with the same APN. The second application APP2 can be any application with a desire for increased bandwidth and/or lower latency. For example, the second application APP2 can be associated with one or more of streaming video, video gaming, augmented reality, virtual reality, industrial automation, unmanned vehicles, driver assisted and/or self-driving vehicle systems, or the like. The second application APP2 can be associated with a content provider in certain instances. The second application APP2 can be associated with a social media service in certain instances.

The UE 102 can provide uplink data to the base station 104. Uplink traffic from the base station 104 can be provided to the combined SGW and PGW 112. The base station 104 can communication with the TDF/TAF block 114 via a S1U interface. The TDF of the TDF/TAF block 114 can filter the uplink traffic into local traffic for the local server 106 and remote traffic for the remote network 108 based on one or more filters. The local traffic can be associated with the second application APP2 and the remote traffic can be associated with the first application APP1. The local traffic can be routed to a local resource, such as the local server 106. The local server 106 can be an edge server). A SGi interface can be implemented between the combined SGW and PGW 112 and the local server 106. Accordingly, the uplink traffic associated with the second application APP2 can be provided to the local server 106 with low latency. The local server 106 can provide downlink data associated with the second application APP2 to the UE 102 via the local gateway 105.

The remote traffic can be routed to the remote network 108. The remote traffic can be routed to the remote server 124 (e.g., an Internet Protocol (IP) server) via the remote PGW 122. The combined SGW and PGW 112 can communicate with the remote PGW 122 over an S5/S8 interface. A SGi interface can be implemented between the remote PGW 122 and the remote server 124. Accordingly, uplink traffic associated with the first application APP1 can be provided to the remote server 124. Such remote traffic may not be associated with low latency and/or high bandwidth specifications relative to traffic associated with the second application APP2. Alternatively or additionally, the UE 102 and/or the user thereof may determine that higher latency and/or lower bandwidth may be suitable for the first application APP1.

The remote server 124 can provide downlink data associated with the first application APP1 to the UE 102 via the local gateway 105. The TAF of the TDF/TAF block 114 can aggregate at least the downlink traffic associated with the first application APP1 from the remote server 124 and the downlink traffic associated with the second application APP2 from the local server 124 based on one or more filters to thereby generate aggregated downlink traffic for the UE 102. The aggregated downlink traffic includes an aggregation of local traffic and remote traffic.

Figure 2:
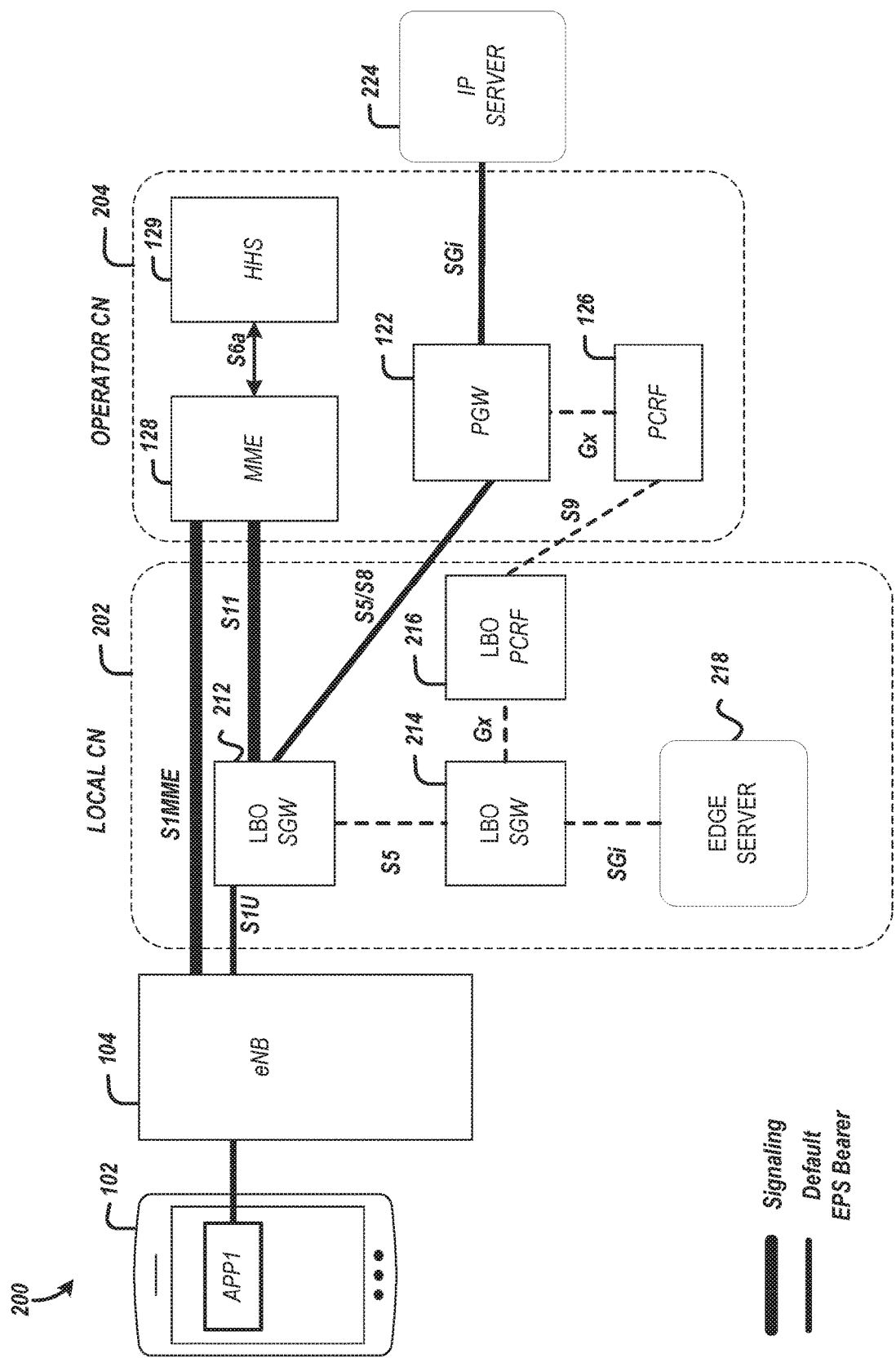
FIG. 2 is a diagram illustrating a default bearer functionality with a local breakout architecture according to an embodiment.

FIG. 2 is a diagram illustrating a default bearer functionality with a local breakout architecture according to an embodiment. FIG. 2 illustrates a communication environment 200 that includes a UE 102, a base station 104, a local network 202, a remote network 204, and a remote server 224. The illustrated local network 202 includes an LBO SGW 212, a LBO PGW 214, a LBO PCRF server 216, and a local server 218. The illustrated remote network 204 includes a PGW 122, a PCRF server 126, a MME 128, and a HHS 129. The remote network 204 can be an operator carrier network. The remote server 224 can be external to the remote network 204 as illustrated. For example, the remote server 224 can be part of a core network. In some other applications, a remote resource can be included in an operator carrier network. The remote server 224 is an example of a remote resource. The remote server 224 can be an IP server, for example.

In the communication environment 200, the UE 102 can setup a default bearer with the remote network 204 in association with the UE 102 connecting to a network in a venue. For example, the default bearer can be setup with the remote PGW 112 via the LBO SGW 212. The default bearer can be a default EPC bearer that is setup with an EPC. The MME 128 of the remote network 208 can select the LBO SGW 212 to be SGW for all data connections (e.g., all LTE data connections) initiated and/or terminated in the venue. Call flows can be the same as a typical call flow in a communication standard, such as LTE. The remote PGW 122 can assign an IP address to the UE 102.

The remote network 204 can initiate a dedicated bearer to implement QoS parameters to meet the demand of certain applications, such as voice over IP and/or voice over LTE applications.

As shown in FIG. 2, the UE 102 can operate a first application APP1. The base station 104 can receive uplink data from the UE 102 associated with the first application APP1 via a wireless link. The base station 104 can signal the remote network 204 to authenticate the UE 102 and route traffic associated with the UE 102 though the LBO SGW 212. For instance, the UE 102 can signal the MME 128 via the base station 104. Then the MME 128 can route traffic associated with the UE 102 to the LBO SGW 212.

The LBO SGW 212 can filter uplink traffic associated with the UE 102 based on one or more filters stored in memory of the local network 202. For example, the LBO SGW 212 can include a memory that stores one or more filters to filter traffic. The memory can include any suitable physical hardware to store data. The memory can be included in the LBO SGW 212. The LBO SGW 212 can determine whether to route UE traffic to a local resource (e.g., the local server 218) or to a remote resource (e.g., the remote server 224). The local server 218 can be any suitable local server, such as an edge server, a local video server in a stadium, a hospital server, a local private network server such as an enterprise local private network server, or the like. In the example shown in FIG. 2, the data associated with the first application APP1 can be routed to the remote server 224. In this example, the LBO SGW 212 can determine that the traffic associated with the first application APP1 can be served by the remote network 204.

Figure 3:
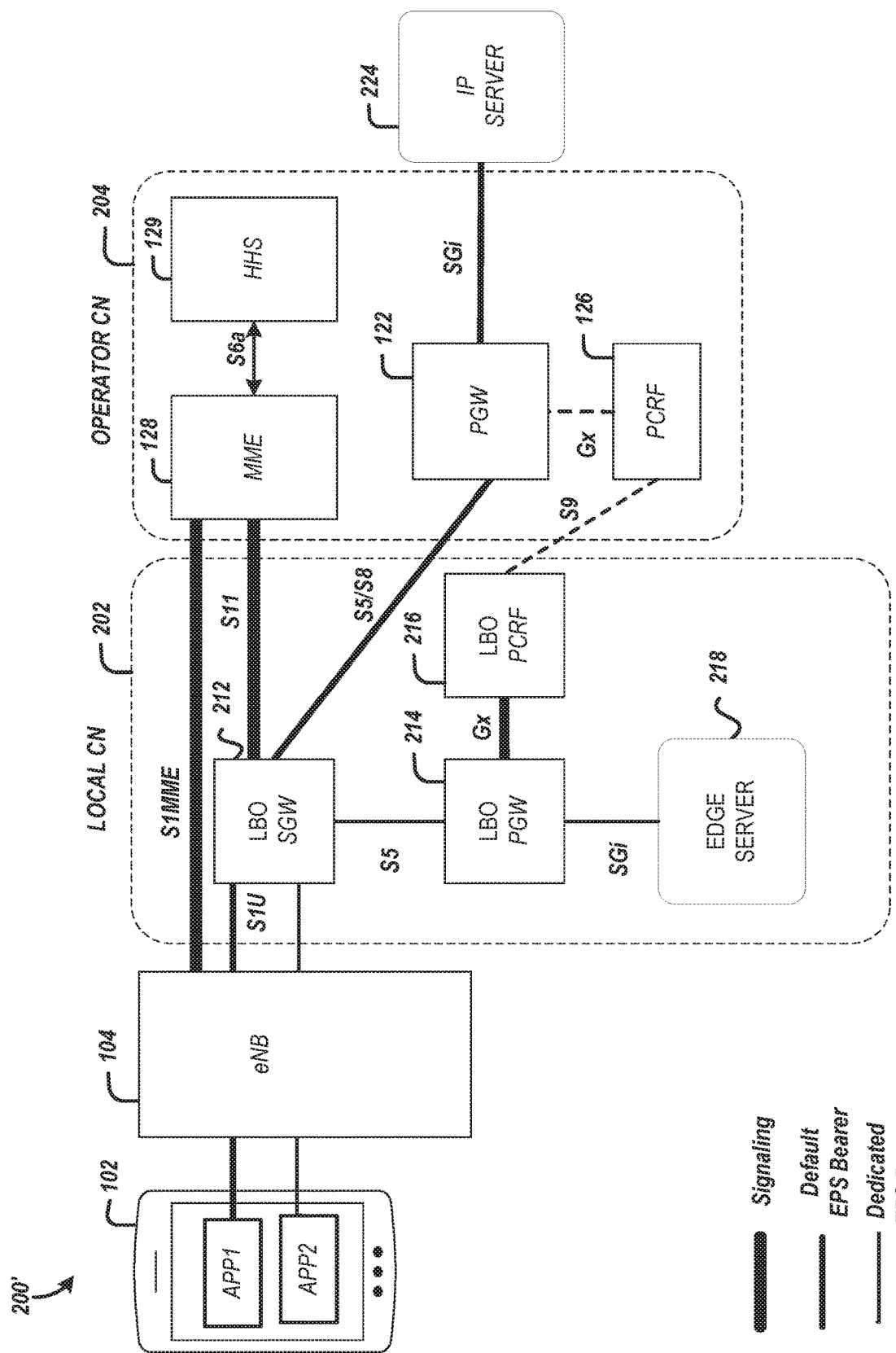
FIG. 3 is a diagram illustrating a dedicated bearer functionality with a local breakout architecture according to an embodiment.

FIG. 3 is a diagram illustrating a dedicated bearer functionality with a local breakout architecture according to an embodiment. FIG. 3 illustrates a communication environment 200' with dedicated bearer functionality to implement QoS parameters. The communication environment 200' includes the same elements as the communication environment 200 of FIG. 2, but the communication environment 200' routes traffic differently and the UE 102 is executing an application that is being served by a local resource with low latency.

In the communication environment 200', the UE 102 is executing a first application APP1 and a second application APP2. A default bearer can handle traffic associated with the first application APP1, for example, as described with reference to FIG. 2. A dedicated bearer can handle traffic associated with the second application APP2. The MME 128 of the remote network 204 can select the LBO SGW 212 for all data connections (e.g., LTE connections) generated from a venue. The LBO SGW 212 can connect with the MME 128 via a S11 interface. The LBO SGW 212 can connect with the remote PGW 122 via a S5/S8 interface.

The traffic associated with the second application APP2 can be routed to the LBO SGW 212. The LBO SGW 212 can filter the traffic associated with the second application APP2 and route this traffic locally based on one or more filters. For example, a filter can indicate to route traffic associated with a target IP address to the LBO PGW 214. Accordingly, the LBO SGW 212 can determine a target IP address associated with the second application APP2 and then steer the traffic associated with the second application APP2 to the local PGW 214 based on a filter indicating to route the traffic associated with the target IP address locally. The local PGW 214 can store an S1 tunnel endpoint identifier (TEID) associated with the UE 102 and use the downlink S1 TEID to direct traffic from local server 218 back to the UE 102.

The LBO SGW 212 can filter out traffic and redirect the local traffic to a local resource according to one or more preconfigured filters. The LBO SGW 212 can filter and steer traffic based on one or more of a variety of filters. Example filters include, a source IP address, a source IP port, a target IP address, a target IP port, a ToS value, a DSCP value, the like, or any suitable combination thereof. Accordingly, the LBO SGW 212 can implement local breakout to provide local traffic to a local resource and remote traffic to a remote resource based on one or more filters. A filter can include a source identifier, such as a source IP address or a source IP port. A filter can include a target identifier, such as a target IP address or a target IP port. A filter can include a service value, such as a ToS value or a DSCP value. A filter can be for a specific application. A filter can be for a group of applications.

The filters can be associated with particular applications and/or services. For example, traffic associated with the second application can be routed locally under a different condition than traffic associated with a third application is routed locally. The filters can be different for different local networks 202. Accordingly, traffic associated with the second application APP2 can be routed locally in a first local network and the same traffic associated with the second application APP2 can be routed to a remote network in a second local network.

The LBO SGW 212 can determine whether to implement QoS based on one or more local policies. In response to determining to implement QoS, the LBO SGW 212 can determine one or more QoS parameters to implement based on the one or more local policies. Accordingly, one or more QoS parameters can be implemented by the local network 202. Determining whether to implement QoS and/or determining one or more QoS parameters can involve packet sniffing and comparing information of a packet with one or more local policies. The LBO SGW 212 can include memory storing the one or more local policies. For example, a profile in local policy can include information associated with one or more of enabling QoS, a disabling QoS, a QoS Class Identifier (QCI), an Allocation and Retention Priority (ARP), a Guaranteed Bit Rate (GBR), a maximum bit rate (MBR), an aggregate maximum bit rate (AMBR) such as an Access Point Name-Aggregate Maximum Bit Rate and/or a User Equipment-Aggregate Maximum Bit Rate (UE-AMBR), APN-Aggregate Maximum Bit Rate (APN-AMBR), a QoS Flow Identifier (QFI), or the like. A profile can be for a particular application and/or a particular service, for example. A profile can be local and applied for a particular local network. In certain applications, the LBO PGW 214 and/or the local PCRF server 216 can determine whether to implement QoS and/or determine one or more QoS parameters to implement.

The LBO SGW 212 can save some or all of the information included in a create session request message sent from MME 128 to the LBO SGW 212 for each UE as part of the UE setup default bearer. The LBO SGW 212 can find stored information for a specific UE according to the IP address assigned to that UE. Then a create session request message sent from LBO SGW 212 to the LBO PGW 214 can be provisioned with a desired QCI and/or ARP in a default EPS bearer QoS request when initiating a dedicated bearer.

The LBO SGW 212 can steer local traffic to the LBO PGW 214. The LBO PGW 214 can perform deep packet inspection. There can be no default layer on the LBO PGW 214. The LBO PGW 214 can signal the LBO PCRF server 216 in response to the LBO SGW 212 determining to implement QoS. The LBO PCRF server 216 can implement charging rules and/or QoS levels. The charging rules can be based on QoS. The LBO PGW 214 can be implemented without assigning another IP address for the UE 102 in association with sending a credit control request message to the local PCRF server 216. The LBO PGW 214 can copy the an IP address assigned to the UE 102 by the remote PGW 122 for populating a credit control request message for the PCRF server 216. The LBO PGW 214 can trigger a dedicated bearer. The LBO PGW 214 can initiate a dedicated bearer setup by sending a create bearer request after a session is created between the LBO PGW 214 and LBO SGW 212. The LBO PGW 214 can signal the LBO PCRF server 216 in response to determining to implement QoS. The LBO PGW 214 can trigger a dedicated bearer. The LBO PGW 214 can route the local traffic to the local server 218.

Although the examples of FIGS. 2 and 3 include descriptions of uplink features, similar functionality can be implemented for aggregating local and remote downlink traffic for transmission to the UE 102. For example, the LBO SGW 212 can aggregate downlink local downlink traffic and remote downlink traffic based on one or more filters stored in memory. Such filters can include one or more filters disclosed herein. The aggregation can be based on a header of a packet of the downlink traffic. Any suitable header sniffing can be implemented. For example, the LBO PGW 214 can perform deep packet inspection on downlink traffic and perform aggregation based on one or more values in a packet.

The local downlink traffic can be received by the LBO SGW 212 from the local server 218 via the LBO PGW 214. The remote downlink traffic can be received by the LBO SGW 212 from the remote server 224 via the remote PGW 122. In the communication environment 200' illustrated in FIG. 3, the local downlink traffic is associated with the second application APP2 and the remote downlink traffic is associated with the first application APP1. The aggregation of local downlink traffic and remote downlink traffic can be performed such that local downlink traffic is received by a user equipment with lower latency than remote downlink traffic. Aggregation based on one or more filters can prioritize which traffic to provide to a user equipment first. Accordingly, aggregation can affect latency. Aggregation can be used to implement QoS.

The examples of FIGS. 2 and 3 include descriptions related to LTE networks. It will be understood the any suitable principles and advantages disclosed herein can be applied to other types of networks and/or other network architectures, such as 5G New Radio (NR) networks. Accordingly, local breakout can be implemented with local QoS in a variety of applications in accordance with the principles and advantages disclosed herein.

Figure 4:
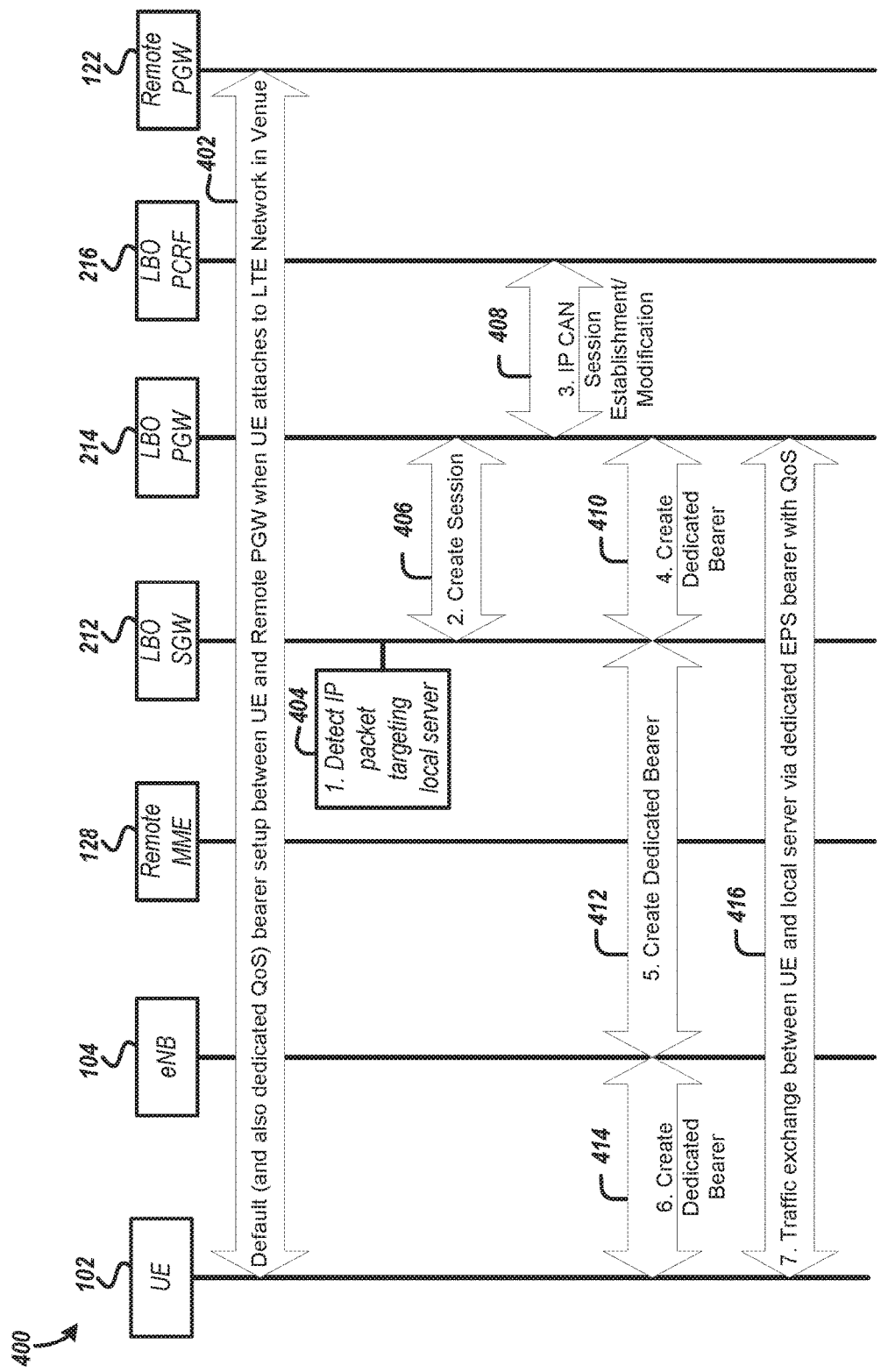
FIG. 4 illustrates example communications and events of initiating a dedicated bearer with a local breakout architecture according to an embodiment.

FIG. 4 illustrates example communications and events 400 of initiating a dedicated bearer with a local breakout architecture according to an embodiment. The communications and events 400 of FIG. 4 relate to initiating a dedicated bearer QoS for certain traffic associated with a UE 102. Traffic can be exchanged between the UE 102 and a local resource with locally implemented QoS with the dedicated bearer QoS. FIG. 4 illustrates example communications and events 400 in a network environment 200' of FIG. 3. Although the example communications and events 400 with be described with reference to the network environment 200' of FIG. 3, any suitable principles and advantages of the example communications and events 400 can be applied to a variety of other communication environments. Additional and/or alternative entities may be included to mediate one or more of the interactions shown such as network routers, switches, security devices, or the like.

In event 402, a default bearer is set up between the UE 102 and the remote PGW 122. The default bearer can be set up in response to a UE 102 attaching to a remote network (e.g., an LTE network) in a venue. A dedicated QoS bearer can also be set up between the UE 102 and the remote PGW 122.

The base station 104 can signal to the remote MME 128 to cause traffic to be routed through the LBO SGW 122. This signaling can be performed before setting up the default bearer in event 402. The LBO SGW 212 can detect an IP packet for routing to a local resource in event 404. The LBO SGW 212 can detect the IP packet based on any suitable filter disclosed herein.

In event 406, the LBO SGW 212 can send a create session communication to the LBO PGW 214. This can configure a session between the LBO SGW 212 and the LBO PGW 214. The LBO PGW 214 can determine whether to implement QoS based on one or more local policies. Alternatively, the LBO SGW 214 can determine whether to implement QoS based on one or more local policies. In response to determining to implement QoS, the LBO PGW 214 can cause a dedicated bear to be implemented for QoS. The LBO PGW 214 can send a communication to the LBO PCRF server 216 to establish and/or modify an IP connectivity access network (IP CAN) session in event 408. Setting up the IP CAN session can provide the IP connectivity associated with cellular subscription information of the UE 102. The communications in events 406 and/or 408 can be 3GPP compliant and/or based on a 3GPP specification.

After the IP CAN session is set up, the LBO PGW 214 can trigger a dedicated bearer between the LBO PGW 214 and the UE 102. A dedicated bearer can be created for communications between the LBO PGW 214 and the LBO SGW 212 in event 410. A dedicated bearer can be created for communications between the LBO SGW 212 and the base station 104 in event 412. Then a dedicated bearer can be created for communications between the base station 104 and the UE 102 in event 414. These dedicated bearers can together implement a dedicated bearer for communications between the LBO PGW 214 and the UE 102. The events to create the dedicated bearer can be based on a 3GPP specification.

The UE 102 can exchange traffic with a local resource in event 416 via a dedicated bearer with QoS. The local resource can be a local server, such as the local server 106 and/or the local server 218. Accordingly, local breakout can be implemented together with local QoS. The traffic exchanged in event 416 can be associated with a particular application and/or service. The traffic exchanged in event 416 can include uplink traffic and/or downlink traffic.

Figure 5:
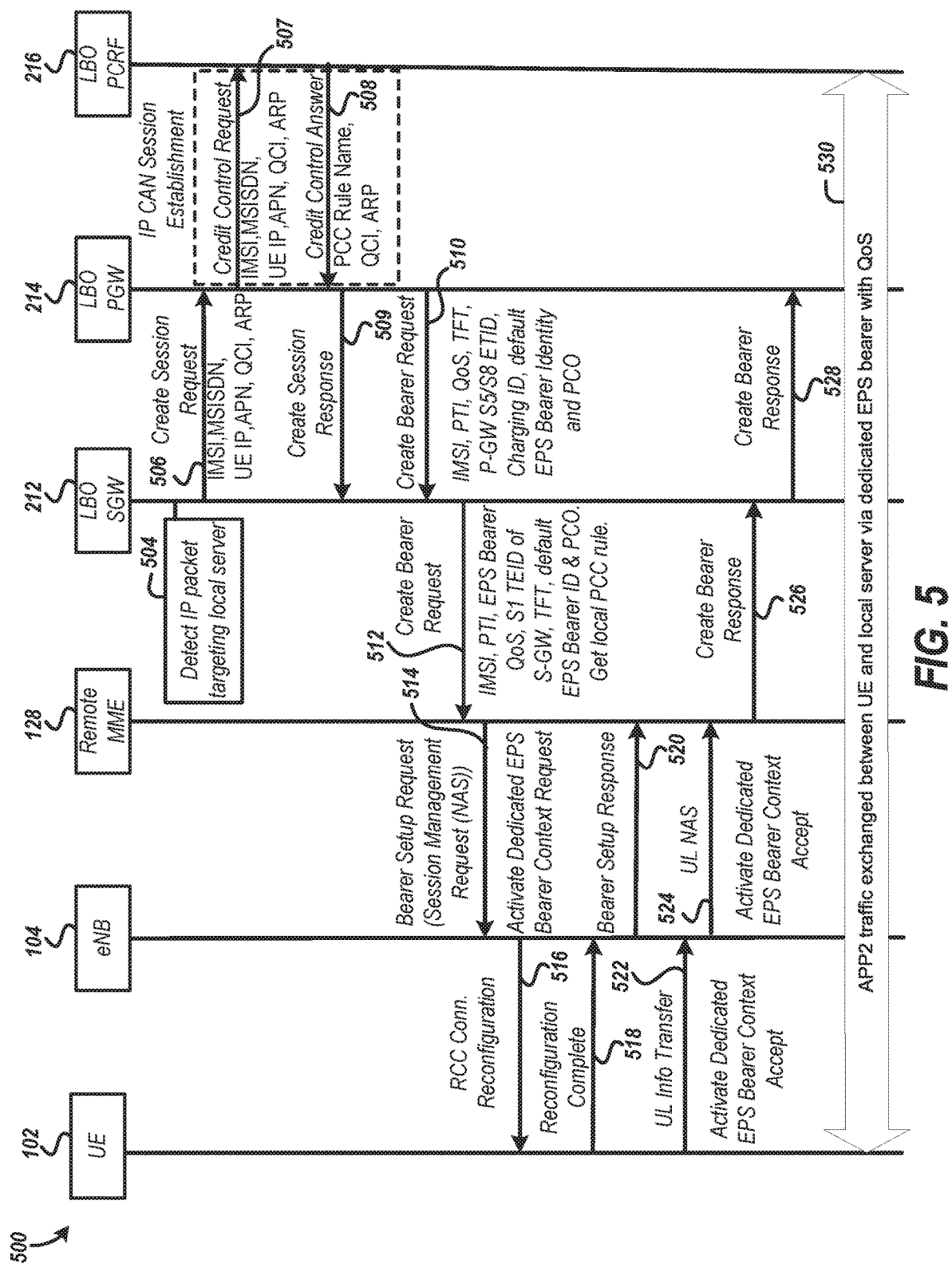
FIG. 5 illustrates example communications and events of initiating a dedicated bearer with a local breakout architecture according to another embodiment.

FIG. 5 illustrates example communications and events 500 of initiating a dedicated bearer with a local breakout architecture according to another embodiment. The communications and events 500 of FIG. 5 relate to initiating a dedicated bearer QoS for certain traffic associated with a UE 102. FIG. 5 relates to a more detailed embodiment than FIG. 4. The communications and events 500 will be described with reference to elements of the network environment 200' of FIG. 3. Any suitable principles and advantages of the example communications and events 500 can be applied to a variety of other communication environments and/or in connection with any suitable communications and events 400 of FIG. 4. Additional and/or alternative entities may be included to mediate one or more of the interactions shown such as network routers, switches, security devices, or the like.

Before the communications and events 500, a create session request can be sent from the MME 128 to the LBO SGW 212. The create session request can include one or more of the following: IMSI, MSISDN if received from the HSS 129, MME TEID for the control plane, public data network (PDN) GW Address, PDN Address, Access point name (APN), Radio Access Technology (RAT) Type (e.g., E-UTRAN, GERAN, or UTRAN), Default EPS Bearer QoS, PDN Type (e.g., IPv4, IPv6, or IPv4v6), APN-AMBR, EPS Bearer Identity, Protocol Configuration Options, Handover Indication if Request Type indicates handover instead of attach, ME Identity, User Location Information (e.g., ECGI), MS Info Change Reporting support indication, Selection Mode that can indicate whether subscribed APN received from the HSS 129 or non-subscribed APN received from UE 102 is selected, one or more charging characteristics, Maximum APN Restriction, Dual Address Bearer flag set if PDN Type is IPv4v6, protocol type on S5/S8 interface, or the like.

In event 504, the LBO SGW 212 can detect an IP packet for routing to a local resource in event 504. The LBO SGW 212 can sent a create session request to the LBO PGW 214 in event 506. The LBO SGW 212 can create a new entry in an EPS Bearer table stored in memory and send a Create Session Request message to the LBO PGW 214 with one or more of the following entries: international mobile subscriber identity (IMSI), Mobile Station International Subscriber Directory Number (MSISDN) if received from the HSS 128, user equipment IP address, LBO SGW Address for a User Plane, LBO SGW TEID for the User Plane, LBO SGW TEID for Control Plane, PDN Address, APN, RAT Type, Default EPS Bearer QoS, PDN Type, APN-AMBR, EPS Bearer Identity, Protocol Configuration Options, Handover Indication, ME Identity, User Location Information, MS Info Change Reporting support indication, Selection Mode, Charging characteristics, Maximum APN Restriction, or Dual Address Bearer flag which can be set if PDN Type is IPv4v6. In some instances, most or all of these entries are included in the create session request.

The LBO SGW 212 can sent a create session request to the LBO PGW 214 in event 506. The LBO SGW 212 can create a new entry in an EPS Bearer table stored in memory and send a Create Session Request message to the LBO PGW 214 with one or more of the following entries: IMSI, MSISDN if received from the 128 HSS, user equipment IP address, LBO SGW Address for User Plane, LBO SGW TEID for User Plane, LBO SGW TEID for Control Plane, PDN Address, APN, RAT Type, Default EPS Bearer QoS, PDN Type, APN-AMBR, EPS Bearer Identity, Protocol Configuration Options, Handover Indication, ME Identity, User Location Information, MS Info Change Reporting support indication, Selection Mode, Charging characteristics, Maximum APN Restriction, or Dual Address Bearer flag which can be set if PDN Type is IPv4v6. In some instances, most or all of these entries are included in the create session request.

The LBO PGW 214 can establish an IP CAN session with the LBO PCRF server 216. This can involve sending a credit control request in event 507 and receiving a credit control answer in event 508. If dynamic Policy and Charging Control (PCC) is deployed, the LBO PGW 214 can perform an IP CAN session establishment procedure with the PCRF server 216 and obtains the default PCC rules for the UE 102. In event 507, the LBO PGW 214 sends a credit control request to the LBO PCRF server 216. The credit control request can include one or more of the following entries: IMSI, UE IP address, User Location Information, Serving Network, RAT Type, APN-AMBR, or Default EPS Bearer QoS. If dynamic PCC is not deployed and the LBO PGW 214 applies local QoS policy, this event can be followed to provide UE IP address to the PCRF server 216. If UE IP address is not available when LBO PGW 214 performs an IP CAN session establishment procedure with the PCRF server 216, the LBO PGW 214 can initiate an IP CAN session modification procedure when UE IP address is available. The PCRF server 216 can modify the APN-AMBR and/or QoS parameters associated with the default bearer in response to the credit control request in event 507. The create control answer can identify one or more PCC rules and/or one or more QoS parameters. In event 508, the credit control answer sent by the PCRF server 216 can include one or more of a PCC rule name, QCI, or ARP.

The LBO PGW 214 can create a new entry in an EPS Bearer table in memory and generate a charging identifier (ID). The LBO PGW 214 can send a Create Session Response message to the LBO SGW 212 in event 509. The create session response can include one or more of the following entries: LBO PGW address for a User Plane, LBO PGW TEID for a User Plane, LBO PGW TEID for Control Plane, PDN Type, PDN Address (e.g., in the case that the LBO PGW received Create Session Request with a UE IP address assigned by the HSS 129 the LBO PGW can allocate the same IPv4 or IPv6 address to the UE 102), EPS Bearer Identity, EPS Bearer QoS, Protocol Configuration Options, Charging ID, Prohibit Payload Compression, APN Restriction, Cause, MS Info Change Reporting Action (Start) (e.g., to cause the LBO SGW 212 to must report to the LBO PGW 214 whenever the location of the UE 102 changes), or APN-AMBR.

In event 510, the LBO PGW 214 can send a create bearer request to the LBO SGW 212. This request can include one or more of the following entries: IMSI, PTI, EPS Bearer QoS, TFT, LBO PGW S5/S8 TEID, Charging ID, default EPS Bearer Identity, or PCO. The LBO SGW 212 can send a create bearer request to the MME 128 in event 512. This request can include one or more of the following entries: IMSI, PTI, EPS Bearer QoS, S1 TEID of LBO SGW, TFT, default EPS Bearer ID, or point of control and observation (PCO). The MME 128 can send a bearer setup request to the base station 104 in event 514. This can activate a dedicated EPC bearer context request. The base station 104 can send a Radio Resource Control (RRC) Connection Reconfiguration communication to the UE 102 in event 516.

In response to completing the reconfiguration, the UE 102 can send a reconfiguration complete communication in event 518. The base station 104 can then send a bearer setup response to the MME 128 in event 520.

The UE 102 can send uplink information to the base station in event 522. This communication can include an Activate Dedicated EPS Bearer Context Accept message. In event 524, and uplink non-access stratum (NAS) message can be send from the base station 104 to the MME 128. This can include an Activate Dedicated EPS Bearer Context Accept message. Then the MME 128 can send a Create Bearer Response to the LBO SGW 212 in event 526. The LBO SGW 212 can send a Create Bearer Response to the LBO PGW 214 in event 528. At this point, a dedicated bearer with QoS can be established between the LBO PGW 214 and the UE 102.

The UE 102 can exchange traffic with a local resource (e.g., the local server 218) in event 530 via a dedicated bearer with QoS. Accordingly, local breakout can be implemented together with local QoS. The traffic exchanged in event 530 can be associated with a particular application and/or service based on one or more filters of the local gateway. The traffic exchanged in event 530 can include uplink traffic and/or downlink traffic.

Figure 6:
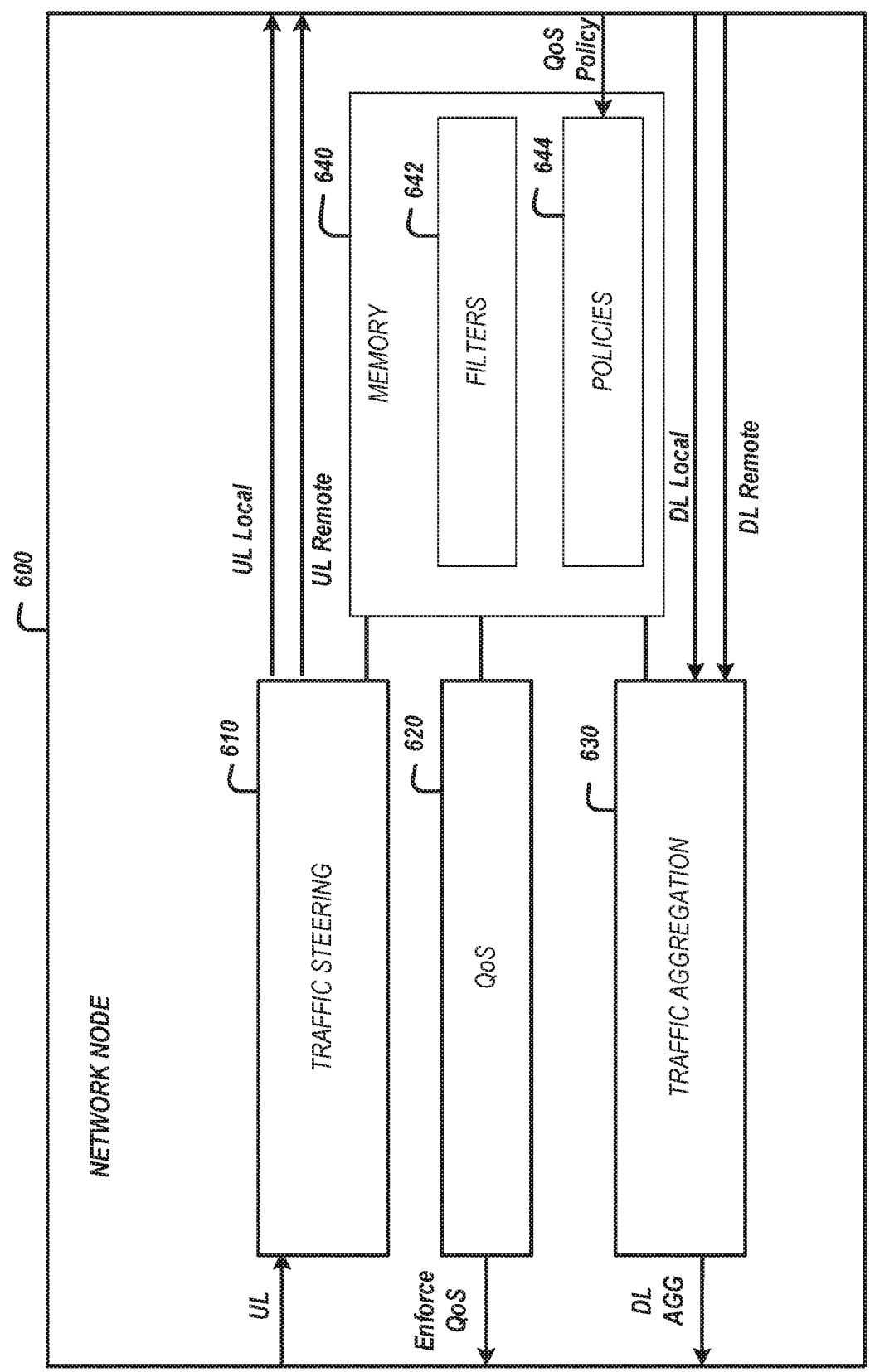
FIG. 6 is a block diagram of a local gateway according to an embodiment.

FIG. 6 is a block diagram of a network node 600 according to an embodiment. The network node 600 can be a local gateway coupled between a base station and a core network. In some instances, the network node 600 can be a base station, such as a next generation Node B (gNB). As illustrated, the network node 600 includes a traffic steering block 610, a quality of service block 620, a traffic aggregation block 630, and a memory 640 storing filters 642 and policies 644.

The traffic steering block 610 is configured to receive uplink traffic UL associated with a user equipment and filter the uplink traffic into local traffic and remote traffic based on at least one of the one or more of the filters 642 stored in the memory 640. The traffic steering block 610 can perform any functionality of the traffic detection and filtering disclosed herein. The traffic steering block 610 can route remote uplink traffic to a remote network and route local uplink traffic to a local resource.

The quality of service block 620 is configured to determine whether to implement quality of service based on one or more local policies 644 stored in the memory 640. The memory 640 can receive one or more policies 644 from a PGW in certain applications. The quality of service block 620 can implement quality of service for uplink traffic and/or downlink traffic. The quality of service block 620 can determine one or more quality of service parameters. The quality of service block 620 can perform any functionality related to local quality of service disclosed herein. The quality of service block 620 can cause transmission of a message to enforce QoS. For example, the network node 600 can send a create session request (e.g., at event 506 of FIG. 5) that causes a base station to activate QoS in certain applications.

The traffic aggregation block 630 can receive local downlink traffic associated with a user equipment, receive remote downlink traffic associated with the user equipment, and aggregate at least the local downlink traffic and the remote downlink traffic into aggregated downlink traffic based on at least one of the filters 642 stored in the memory 640. The memory 640 can include any suitable memory elements arranged to store the filters 642 and the policies 644. The filters 642 can be include any suitable filter disclosed herein. The policies 644 can be include any suitable policy disclosed herein.

Figure 7:
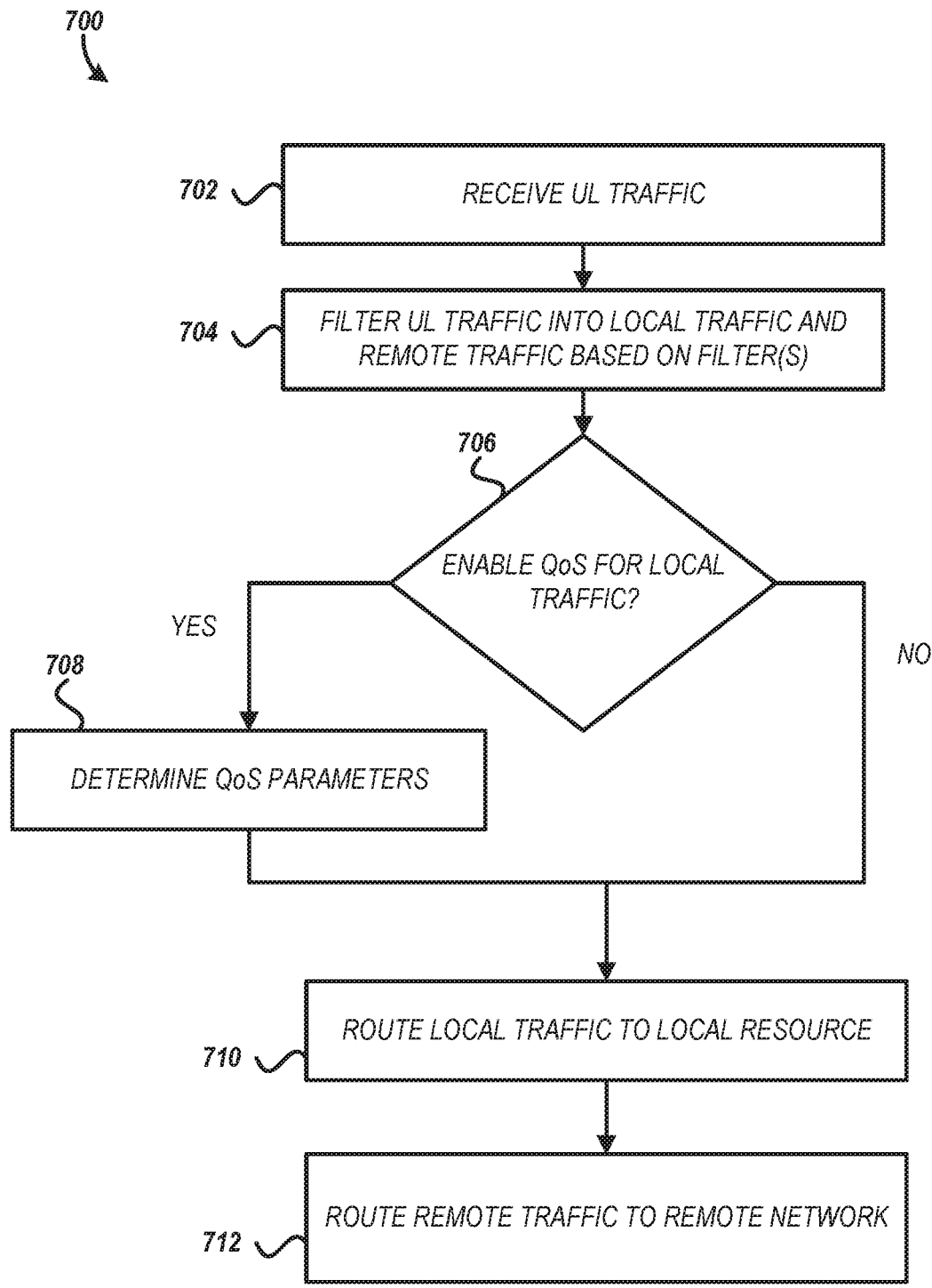
FIG. 7 is a flow diagram illustrating an example method of local breakout according to an embodiment.

FIG. 7 is a flow diagram illustrating an example method 700 of local breakout according to an embodiment. The method 700 can be performed with any suitable local breakout architecture disclosed herein. Any suitable principles and advantages associated with any of the embodiments disclosed herein can be implemented in the method 700. The method 700 relates to a network node filtering and routing uplink traffic based on local filter(s). The network node can be a local gateway. The network node can be a base station.

At block 702, network node receives uplink traffic. For example, a local gateway can receive uplink traffic from a base station. The uplink traffic is filtered into local traffic and remote traffic based on one or more filters stored in memory of the network node at block 704. With this filtering, the remote traffic can be associated with a first application of a user equipment and the local traffic can be associated with a second application of the user equipment. At block 706, the network node can determine whether to enable QoS for local traffic based on one or more policies stored in memory of the network node. If the network node determines to implement QoS, the local gateway can determine one or more QoS parameters at block 708. This can implement QoS in a local network. After determining QoS parameter(s) or determining not to enable QoS, local traffic is routed to a local resource at block 710. Remote traffic is routed to a remote network at block 712.

Figure 8:
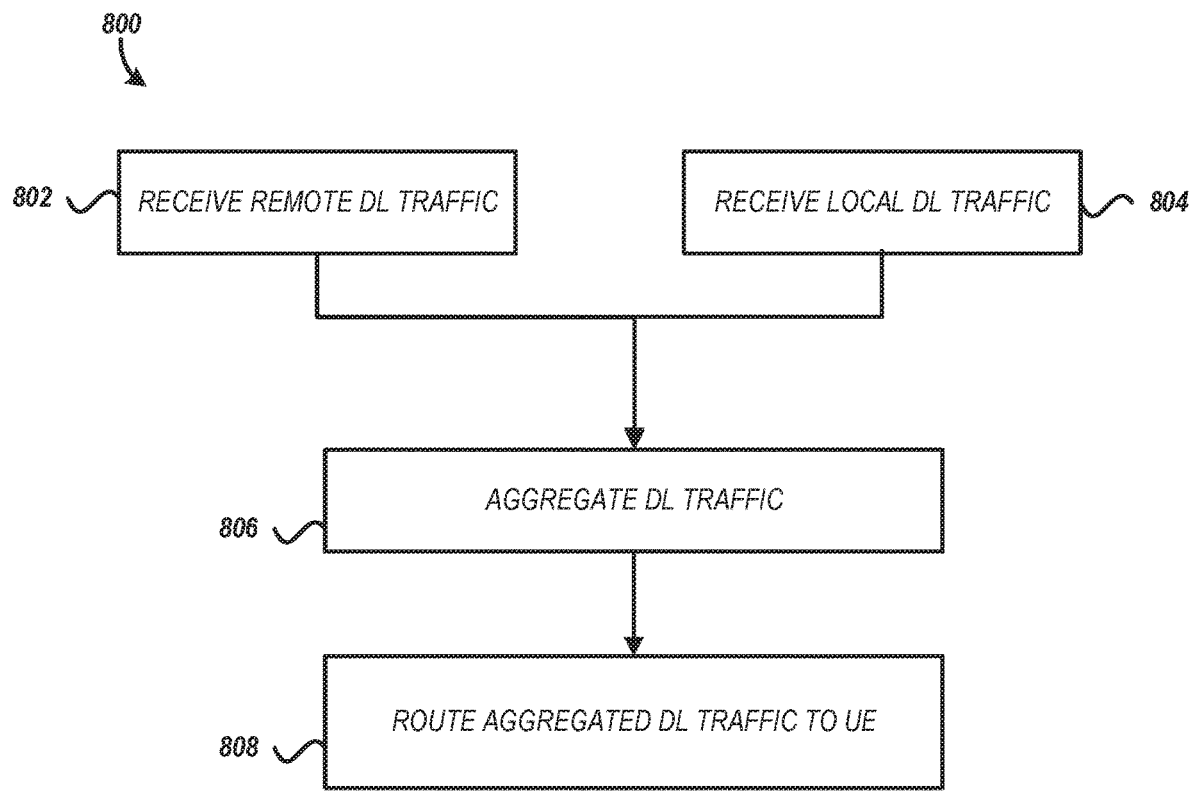
FIG. 8 is a flow diagram illustrating an example method of aggregating local and remote traffic according to an embodiment.

FIG. 8 is a flow diagram illustrating an example method 800 of aggregating local and remote traffic according to an embodiment. The method 800 can be performed with any suitable local breakout architecture disclosed herein. Any suitable principles and advantages associated with any of the disclosed herein above can be implemented in the method 800. The method 800 relates to a network node aggregating local and remote traffic based on local filter(s). The network node can be a local gateway. The network node can be a base station.

At block 802, a network node receives remote downlink traffic from a remote network. The remote downlink traffic can be associated with a first application of a user equipment. The network node receives local downlink traffic from a local resource at block 804. The local downlink traffic can be associated with a second application of a user equipment. At block 806, the network node aggregates at least the local downlink traffic and the remote downlink traffic based on one or more filters stored in memory of the network node. Accordingly, the network node can provide an aggregation of local and remote downlink traffic. In some instances, the method 800 includes determining whether to enable QoS and/or enabling QoS before aggregating downlink traffic at block 806. The network node routes the aggregated downlink traffic to the user equipment via a base station at block 808.

Figure 9:
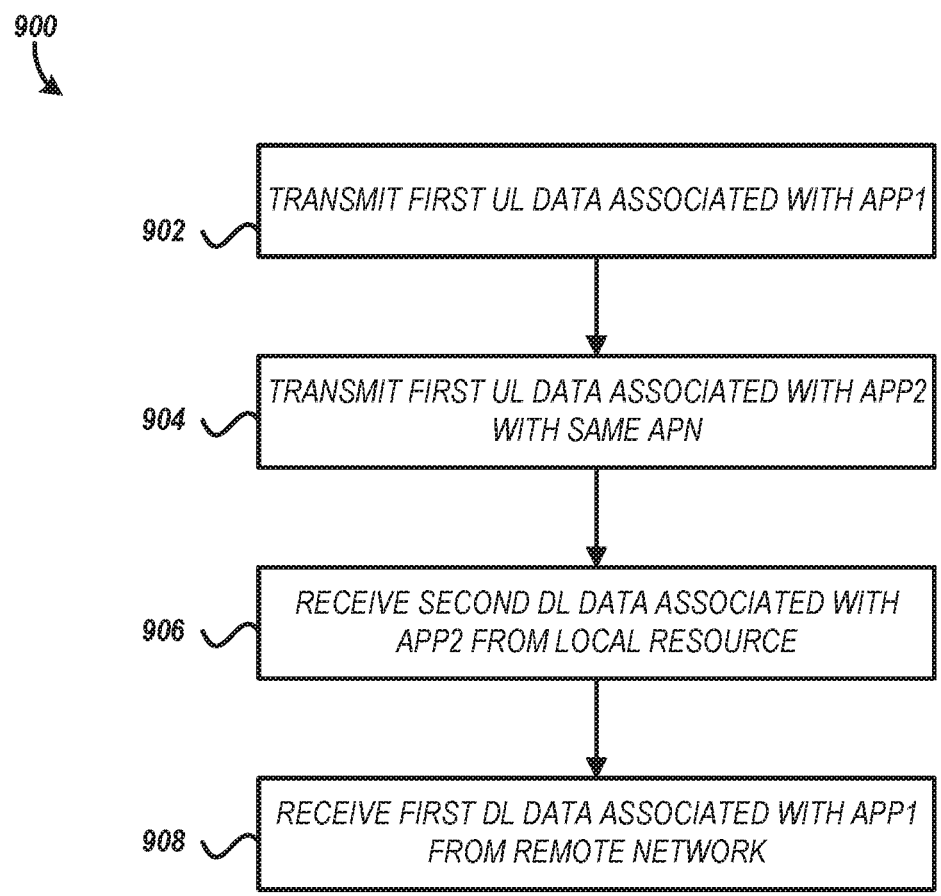
FIG. 9 is a flow diagram illustrating an example method of operating a user equipment according to an embodiment.

FIG. 9 is a flow diagram illustrating an example method 900 of operating a user equipment according to an embodiment. The method 900 can be performed with any suitable UE communicating with any suitable network node (e.g., any suitable local gateway) disclosed herein. Any suitable principles and advantages associated with any of the embodiments disclosed herein can be implemented in the method 900. The method 900 relates to communications with a UE in association with local breakout in accordance with the principles and advantages disclosed herein.

At block 902, a UE transmits first uplink data associated with a first application of the UE to a network node. The network node can be a local gateway. The network node can be a base station. The UE transmits second uplink data associated with a second application of the UE to the network node at block 904. The first downlink data and the second downlink data can be associated with the same APN. The second application can have a lower latency specification than the first application. The network node can be a local gateway in communication with the UE via a base station, such as an eNodeB or a gNodeB. The local gateway can perform local breakout including traffic steering and traffic aggregation. In some other embodiments, the network node can be a base station, such as a gNodeB. In such embodiments, the base station can perform local breakout including traffic steering and traffic aggregation. The UE receives first downlink data associated with the first application from a remote network via the network node at block 906. At block 908, the UE receives second downlink data associated with the second application from a local resource via the network node such that the second uplink data is received with a lower latency than the first uplink data. The UE can receive an aggregation of downlink data that include local downlink data and remote downlink data.

Figure 10:
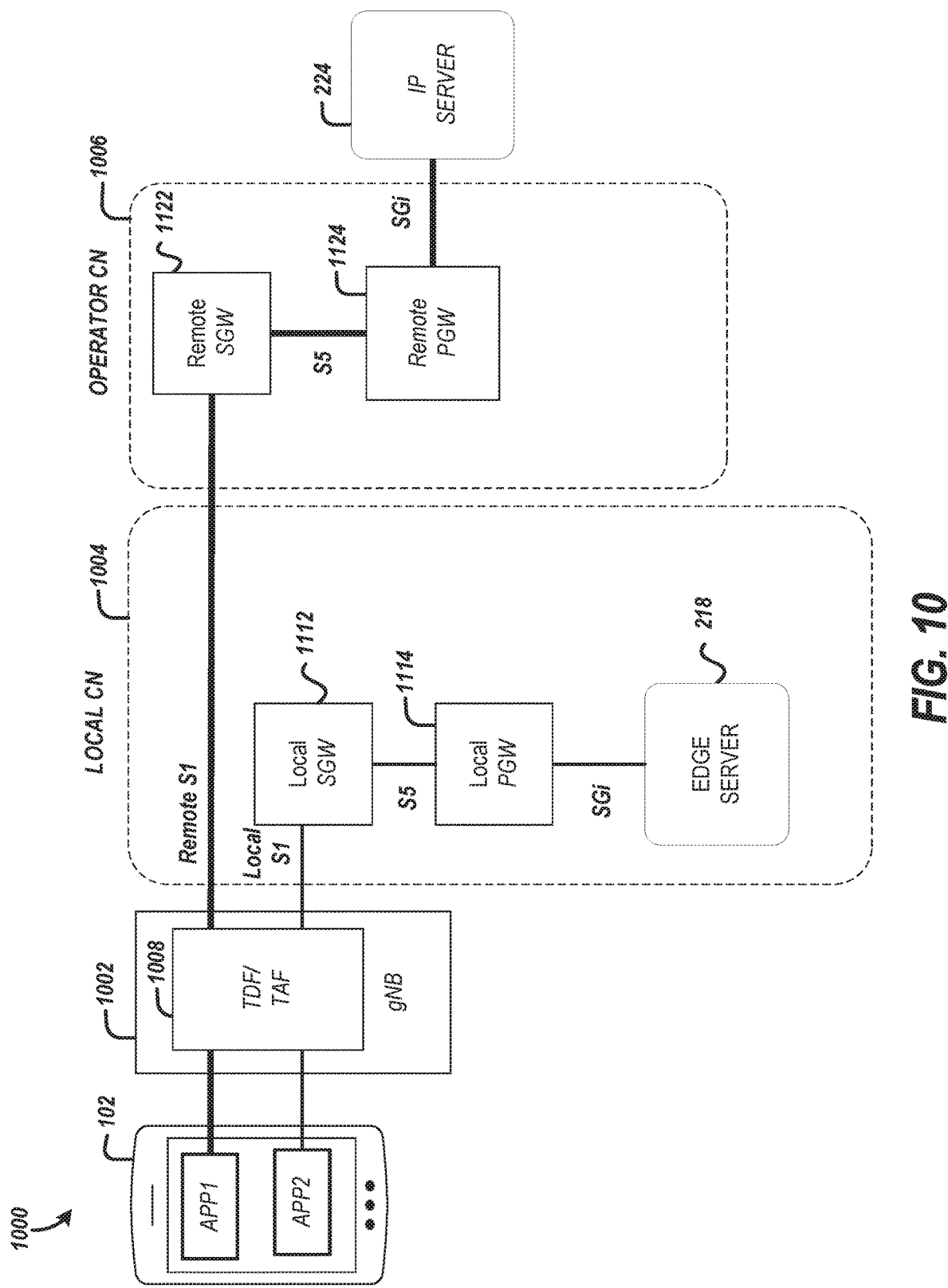
FIG. 10 is a diagram illustrating a local breakout architecture in a communication environment according to an embodiment.

FIG. 10 is a diagram illustrating a local breakout architecture in a communication environment 1000 according to an embodiment. As illustrated, the communication environment 1000 includes a UE 102, a base station 1002, a local network 1004, an operator carrier network 1006, and a remote server 224. In the communication environment 1000, local breakout can be implemented in a base station 1002. The base station 1002 can be gNB for 5G NR applications. The base station 1002 includes a TDF/TAF block 1008. The TDF/TAF block 1008 can implement any suitable traffic filtering and traffic aggregation disclosed herein. Accordingly, local breakout can be implemented by the base station 1002. The base station 1002 can implement local QoS in accordance with any suitable principles and advantages disclosed herein. The base station 1002 can trigger QoS locally.

An example of local breakout in the communication environment 1000 will now be discussed. The UE 102 can execute a first application APP1 and a second application APP2. The UE 102 can wirelessly exchange information with the base station 1002.

The TDF/TAF block 1008 can determine that the first application APP1 can be served by a remote resource. For example, the first application APP1 can handle a relatively high latency. The base station 1002 can route remove traffic to a remote SGW 1122 of the operator carrier network 1006 via a remote S1 interface. The remote traffic can be routed from the remote SGW 1122 to the remote server 224 (e.g., an IP server) via the remote PGW 1124. Accordingly, uplink traffic associated with the first application APP1 can be provided to the remote server 224. Such remote traffic may not be associated with low latency and/or high bandwidth specifications relative to traffic associated with the second application APP2. Alternatively or additionally, the UE 102 and/or the user thereof may determine that higher latency and/or lower bandwidth may be suitable for the first application APP1. Remote downlink traffic can be routed from the remote server 224 to the UE 102 via the TDF/TAF block 1008 of the base station 1002. The TDF/TAF block 1008 can aggregate the remote traffic with the local traffic to provide the UE 102 with an aggregation of remote and local downlink traffic.

The TDF/TAF block 1008 can determine that the second application APP1 can be served by a local resource. For example, the second application APP1 can specify a relatively low latency. The base station 1002 can route local traffic to a local SGW 1112 of the local network 1004 via a local S1 interface. The local traffic can be routed from the local SGW 1112 to the local server 218 (e.g., an edge server) via the local PGW 1114. Accordingly, uplink traffic associated with the second application APP2 can be provided to the local server 218. Such local traffic may be associated with low latency and/or high bandwidth specifications. Alternatively or additionally, the UE 102 and/or the user thereof may determine that lower latency and/or higher bandwidth may be suitable for the second application APP2. Local downlink traffic can be routed from the local server 218 to the UE 102 via the TDF/TAF block 1008 of the base station 1002. The TDF/TAF block 1008 can aggregate the local traffic with the remote traffic to provide the UE 102 with an aggregation of remote and local downlink traffic.

Depending on the embodiment, certain acts, events, or functions of any of the processes or algorithms described herein can be performed in a different sequence, can be added, merged, or left out altogether (e.g., not all described operations or events are necessary for the practice of the process or algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without other input or prompting, whether these features, elements, and/or steps are included or are to be performed in any particular embodiment. The terms "comprising," "including," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated or generally understood from context, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Connections can be via an air interface and/or via wires.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A network node with local breakout, the network node comprising:
    a memory configured to store one or more filters for aggregating traffic and at least one filter for filtering traffic;
    a traffic aggregation block comprising physical hardware configured to receive local downlink traffic associated with a wireless communication device, receive remote downlink traffic associated with the wireless communication device, and aggregate at least the local downlink traffic and the remote downlink traffic into aggregated downlink traffic based on at least one of the one or more filters; and
    a traffic steering block configured to receive uplink traffic associated with the wireless communication device and filter the uplink traffic into local uplink traffic and remote uplink traffic based on the at least one filter for filtering traffic;
    wherein the network node is configured to receive the local downlink traffic from a local resource, receive the remote downlink traffic from a remote network, and route the aggregated downlink traffic to the wireless communication device such that the wireless communication device receives the local downlink traffic with a lower latency than the remote downlink traffic; and
    wherein the network node is configured to route the local uplink traffic to a local network and route the remote uplink traffic to the remote network, the local network including the local resource.

2. The network node of claim 1, wherein the remote downlink traffic is associated with a first application of the wireless communication device, and the local downlink traffic is associated with a second application of the wireless communication device.

3. The network node of claim 1, wherein a first filter of the one or more filters is associated with a first application of the wireless communication device and a second filter of the one or more filters is associated with a second application of the wireless communication device.

4. The network node of claim 1, further comprising a quality of service block comprising physical hardware configured to:
determine whether to implement quality of service based on one or more local policies stored in the memory; and
implement one or more quality of service parameters based on the one or more local policies in response to determining to implement quality of service.

5. The network node of claim 1, wherein the local downlink traffic and the remote downlink traffic are associated with the same Access Point Name.

6. The network node of claim 1, wherein the network node is a local gateway, and the local gateway is coupled between a base station and the remote network.

7. The network node of claim 1, wherein the network node is a next generation Node B (gNB).

8. The network node of claim 7, wherein the gNB is configured to trigger quality of service.

9. The network node of claim 1, wherein the traffic aggregation block is configured to generate the aggregated downlink traffic by at least determining whether information from a header of a packet of the local downlink traffic corresponds to at least one of the one or more filters.

10. The network node of claim 1, wherein the one or more filters identify at least one of a source Internet Protocol address, a source Internet Protocol port, a target Internet Protocol address, a target Internet Protocol port, a Type of Service value, or a Differentiated Services Code Point value.

11. The network node of claim 1, wherein the traffic steering block is configured to filter the uplink traffic by at least determining whether information from a header of a packet of the uplink traffic corresponds to the at least one filter for filtering traffic.

12. A network node with local breakout, the network node comprising:
a memory configured to store one or more filters for aggregating traffic; and
a traffic aggregation block comprising physical hardware configured to receive local downlink traffic associated with a wireless communication device, receive remote downlink traffic associated with the wireless communication device, and aggregate at least the local downlink traffic and the remote downlink traffic into aggregated downlink traffic based on at least one of the one or more filters;
wherein the network node is configured to receive the local downlink traffic from a local resource, receive the remote downlink traffic from a remote network, and route the aggregated downlink traffic to the wireless communication device such that the wireless communication device receives the local downlink traffic with a lower latency than the remote downlink traffic;
wherein the network node is a local gateway that comprises a local serving gateway and a local packet gateway, the local serving gateway comprising the traffic aggregation block and a quality of service block, the local packet gateway configured to trigger a dedicated bearer for the local downlink traffic in response to the quality of service block determining to implement quality of service.

13. A method of local breakout, the method comprising:
receiving, by a network node, remote downlink traffic from a remote network, wherein the remote downlink traffic is associated with a first application of a user equipment;
receiving, by the network node, local downlink traffic from a local resource, wherein the local downlink traffic is associated with a second application of a user equipment;
aggregating, by the network node, at least the remote downlink traffic with the local downlink traffic into aggregated downlink traffic based on one or more filters for aggregating traffic stored in memory of the network node;
routing, by the network node, the aggregated downlink traffic to the user equipment;
receiving, by the network node, uplink traffic;
filtering the uplink traffic into local uplink traffic and remote uplink traffic based on one or more filters for filtering traffic stored in the memory of the network node, wherein the remote uplink traffic is associated with the first application of the user equipment, and wherein the local uplink traffic is associated with the second application of the user equipment;
routing the local uplink traffic to a local network that comprises the local resource; and
routing the remote uplink traffic to the remote network.

14. The method of claim 13, further comprising determining, by the network node, to implement quality of service based on one or more local policies stored in the memory of the network node.

15. The method of claim 13, wherein the local downlink traffic and the remote downlink traffic are associated with the same Access Point Name.

16. The method of claim 13, wherein the aggregating comprises determining whether information from a header of a packet of the local downlink traffic matches with at least one of the one or more filters.

17. The method of claim 13, wherein the network node is a local gateway that is coupled between a base station and a remote network.

18. The method of claim 13, wherein the network node is a next generation Node B (gNB).

19. The method of claim 13, wherein the one or more filters identify at least one of a source Internet Protocol address, a source Internet Protocol port, a target Internet Protocol address, a target Internet Protocol port, a Type of Service value, or a Differentiated Services Code Point value.

20. The method of claim 17, wherein the local gateway comprises a local serving gateway and a local packet gateway, the local serving gateway performs the aggregating, and the method further comprises:
determining to implement quality of service by the local packet gateway; and
triggering, by the local packet gateway, a dedicated bearer for the local downlink traffic in response to the determining to implement quality of service.

21. The method of claim 18, further comprising triggering quality of service by the gNB.

22. The method of claim 13, wherein the filtering the uplink traffic comprises determining whether information from a header of a packet of the uplink traffic corresponds to the one or more filters for filtering traffic.

* * * * *